(12) United States Patent
Montelius

(10) Patent No.: US 11,084,237 B2
(45) Date of Patent: Aug. 10, 2021

(54) METHOD AND PRINTING HEAD FOR LOCALLY INTRODUCING A LIGHT EMITTER OR A PLASMONIC ELEMENT INTO A LIGHT GUIDE

(71) Applicant: EMBEDDED NANO EUROPE AB, Stockholm (SE)

(72) Inventor: Lars Montelius, Braga (PT)

(73) Assignee: EMBEDDED NANO EUROPE AB, Stockholm (SE)

( * ) Notice: Subject to any disclaimer, the term of this patent is extended or adjusted under 35 U.S.C. 154(b) by 687 days.

(21) Appl. No.: 15/779,799

(22) PCT Filed: Nov. 4, 2016

(86) PCT No.: PCT/EP2016/076622
§ 371 (c)(1),
(2) Date: May 31, 2018

(87) PCT Pub. No.: WO2017/092965
PCT Pub. Date: Jun. 8, 2017

(65) Prior Publication Data
US 2020/0298513 A1   Sep. 24, 2020

(30) Foreign Application Priority Data
Nov. 30, 2015   (EP) .................................... 15197113

(51) Int. Cl.
*G02B 6/02*   (2006.01)
*B29D 11/00*   (2006.01)
*F21V 8/00*   (2006.01)

(52) U.S. Cl.
CPC ...... *B29D 11/00663* (2013.01); *G02B 6/0041* (2013.01); *G02B 6/0229* (2013.01)

(58) Field of Classification Search
CPC ............ B29D 11/00663; G02B 6/0041; G02B 6/0229; G02B 6/006; G02B 6/0003;
(Continued)

(56) References Cited

U.S. PATENT DOCUMENTS

2005/0069254 A1   3/2005   Schultheis et al.
2005/0084229 A1*  4/2005   Babbitt ................ G02B 6/0003
                                                      385/146
(Continued)

FOREIGN PATENT DOCUMENTS

CN   101946207 A   1/2011
CN   103895227 A   7/2014
(Continued)

OTHER PUBLICATIONS

Christian Wagner, et al., "Scanning Quantum Dot Microscopy", Physical Review Letters, Jul. 6, 2015, PRL 115, 026101 (2015). pp. 1-6.
International Search Report & Written Opinion dated Jan. 24, 2017 in PCT/EP2016/076622 filed Nov. 4, 2016.
First Office Action dated Jul. 26, 2019, issued in Chinese Application No. 201680079071.2, 16 pages with English translation.

*Primary Examiner* — Ellen E Kim
(74) *Attorney, Agent, or Firm* — Xsensus LLP

(57) ABSTRACT

A method for locally introducing a light emitter or a plasmonic element into a light guide is provided. The method (300) comprising the acts of: applying (302) a printing head (100) to a surface (204) of the light guide (202, 404), the printing head (100, 200) comprising an insertion portion (102) comprising the light emitter (106) or the plasmonic element and a heating element (108), heating (304) the heating element (108) such that a portion (205) of the surface (204) of the light guide (202, 404) is locally heated, pressing (306) the printing head (100, 200) into the light guide (202, 404) such that at least a portion (208) of the insertion portion (102) is inserted into the light guide (202, 404), introducing (308) the light emitter (106) or the plas-
(Continued)

monic element (500) into the light guide (202, 404) via the insertion portion (102). A printing head (100, 200) for locally introducing a light emitter (106) or a plasmonic element (500) into a light guide (202, 404) is also provided. A light guide (202, 404) comprising a light emitter (106) or a plasmonic element (200) introduced into the light guide (202, 404) by use of the method (300) or the printing head (100, 200) is further provided.

14 Claims, 4 Drawing Sheets

(58) Field of Classification Search
CPC .............. G02B 6/0065; B65D 2203/12; C03C 14/006; B82Y 20/00; B82Y 40/00
See application file for complete search history.

(56) References Cited

U.S. PATENT DOCUMENTS

| | | |
|---|---|---|
| 2009/0161383 A1 | 6/2009 | Meir et al. |
| 2012/0118381 A1 | 5/2012 | Debije et al. |

FOREIGN PATENT DOCUMENTS

| | | |
|---|---|---|
| FR | 2 997 647 | 5/2014 |
| WO | 2014033686 | 3/2014 |
| WO | 2014154722 | 10/2014 |
| WO | 2015124489 | 8/2015 |

* cited by examiner

METHOD AND PRINTING HEAD FOR LOCALLY INTRODUCING A LIGHT EMITTER OR A PLASMONIC ELEMENT INTO A LIGHT GUIDE

FIELD OF INVENTION

The present invention relates to a method and a printing head for locally introducing a light emitter or a plasmonic element into a light guide. A light guide comprising a light emitter or a plasmonic element introduced into the light guide by use of the method or the printing head is further provided.

TECHNICAL BACKGROUND

In lighting devices there is often a need to utilize light emitters for efficient light emission and tailoring of the spatial or spectral distribution of the light emitted. The light emitters may for example be embedded inside a light guide such that they are protected from the environment and fixed in position. The light guide comprising light emitters may further be arranged to direct light to the light emitters providing efficient excitation of the light emitters. The light guide may moreover be formed as an envelope, for instance having a spherical shape, to provide light emission at desired angles in space. To this end, the light guide may be formed as a lamp envelope or a container, such as a bottle, in order to provide a light silhouette given by the shape of the light guide. Hence, the arrangement of the light guide and/or of the light emitters in the light guide may be used to design the illumination properties of a lighting device. A desired decorative effect may further be provided by the light emitters in the light guide.

It is, however, challenging to introduce light emitters in the light guide of the lighting device, especially to introduce the light emitters after the light guide has been manufactured.

SUMMARY OF INVENTION

An object of the present invention is to provide means for introducing a light emitter or a plasmonic element into a light guide.

According to a first aspect this is achieved by providing a method comprising the acts of: applying a printing head to a surface of the light guide, the printing head comprising an insertion portion comprising the light emitter or the plasmonic element and a heating element, heating the heating element such that a portion of the surface of the light guide is locally heated, pressing the printing head into the light guide such that at least a portion of the insertion portion is inserted into the light guide, introducing the light emitter or the plasmonic element into the light guide via the insertion portion.

A method for efficient introduction of the light emitter or the plasmonic element into the light guide is thereby achieved. The method further enables efficient positioning of the light emitter or the plasmonic element in the light guide. Light emitters or plasmonic elements may by the method be arranged in pattern which may comprise ordered and/or random features. A flexible and versatile method to position light emitters or plasmonic elements at desired locations in the light guide is provided. An improved freedom to choose the location at which the pattern is formed in the light guide is further achieved by the method. The light emitters or plasmonic elements may further be introduced into the light guide after the light guide has been manufactured, e.g., after the light guide has been molded to a given shape.

The heating may facilitate efficient local melting of the material forming the light guide. In other words, heat generated by the heating element of the printing head may locally melt a portion of the light guide such that the light emitter or the plasmonic element may be introduced into the light guide via the locally melted portion.

The wording "light guide" should here be understood as a structure arranged to transmit or guide light along its extension. Light may for example be guided inside the light guide by multiple reflections. The light is preferably transmitted within the light guide by multiple reflections at the interface of the light guide and its surrounding environment, i.e. by total internal reflection, TIR.

As non-limiting examples, the light guide may be formed by a screen surface of a display or a touch panel, a window pane, a mirror, or a container wall surface. The light guide may further be formed by a lens, for example, a lens for glasses, a camera or a binocular. The light guide may also be formed by a windshield or a mirror for a vehicle. The light guide may further comprise or be formed by a glass material. Hence, the light guide may be formed by a plate of glass for a window, a screen, a door or a shower cabin. The light guide may also be formed by a bathroom or kitchen glass sink. Alternatively, the light guide may be formed by a glassware such as a glass, a vase, a bottle or a flask.

The light guide may alternately be formed by a plastic material. The wording "to a surface of a light guide" should be understood as the printing head being brought in contact with or in the vicinity of the surface of the light guide such that the light emitter or the plasmonic element may be introduced into the light guide via a surface of the light guide.

The wording "light emitter" should be construed as element such as a nanoparticle or molecule that emits light. The light emitter may further be excited by light. The light emitter may emit light by luminescence such as fluorescence or photoluminescence. Hence, the light emitter may act as a wavelength converting element, converting incoming, i.e. exciting, light of a first wavelength to light of a second wavelength, the light of the second wavelength being emitted from the light emitter.

The wording "plasmonic element" should be construed as an element or structure in which plasmons may be excited. Plasmons should here be understood as quanta of plasma oscillations associated with a collective oscillation of charge density. The charges may for instance be provided by electrons.

The insertion portion may comprise a recess comprising the light emitter or the plasmonic element.

Efficient storage of the light emitter or the plasmonic element in the printing head may thereby be achieved.

The insertion portion may comprise a channel providing passage of the light emitter or the plasmonic element.

Efficient transportation of the light emitter or the plasmonic element via channel into the light guide may thereby be achieved.

The printing head may further comprise a heating element and wherein the method may further comprise the act of heating the heating element such that a portion of the surface of the light guide is locally heated. The heating may facilitate efficient local melting of the material forming the light guide. Hence, the method also allows for introduction of a local emitter or a plasmonic elements after the light guide has been manufactured, e.g. after the material of the light guide has solidified. Hence, heat generated by the heating element of the printing head may locally melt a portion of the light guide such that the light emitter or the plasmonic element may be introduced into the light guide via the locally melted portion.

There may be a temporal overlap of the acts of heating, pressing and/or introducing. A fast and accurate introduction of a light emitter or a plasmonic element into the light guide may thereby be realized by the method.

The act of pressing, heating and/or introducing may be performed in a time period in the range of 1-10 milliseconds. A high throughput method for introducing a light emitter or a plasmonic element into a light guide may thereby be provided.

The light guide may comprise a glass material.

The act of heating may further comprise heating the heating element to a temperature in the range of 500° C.-900° C. for a time period in the range of 1-10 microseconds. Temperatures in this range may for example facilitate an effective local melting of a light guide comprising glass material. This time period further allows for local melting of the glass material allowing for efficient introduction of the light emitter or the plasmonic element into the light guide via the locally melted glass material.

According to a second aspect a printing head for locally introducing a light emitter or a plasmonic element into a light guide is provided. The printing head comprising: an insertion portion comprising the light emitter or the plasmonic element, the insertion portion being arranged to be inserted into the light guide and a heating element arranged to locally heat a portion of the surface of the light guide.

A printing head is thereby provided which allows for efficient introduction of the light emitter or the plasmonic element into the light guide. The printing head further enables efficient positioning the light emitter or the plasmonic element into the light guide.

The insertion portion may comprise a recess comprising the light emitter or the plasmonic element.

The insertion portion may comprise a channel providing passage of the light emitter or the plasmonic element.

The printing head may further comprise an actuator arranged to propagate the light emitter or the plasmonic element through the channel and into the light guide. The actuator allows for efficient transportation, via the channel, of the light emitter or the plasmonic element into the light guide.

The insertion portion may have a width in the range of 0.1 mm-2 mm. This facilitates local introduction of a light emitter or a plasmonic element into the light guide. The light emitter or a plasmonic element may thereby be introduced at a given location into the light guide without substantially affecting the light guide at other locations.

The printing head may comprise a micro-capillary tube.

The printing head may comprise a heating element arranged to locally heat a portion of the surface of the light guide. A local heating and melting of the light guide may thereby be provided, allowing for efficient introduction of the light emitter or the plasmonic element via the heated portion of the light guide.

The heating element may be arranged to heat at least a portion of the insertion portion. A local heating and melting of the light guide may thereby be provided by the heated portion of the insertion portion.

The light emitter or the plasmonic element may be distributed in a paste, a powder or a fluid. Improved transfer of the light emitter or the plasmonic element from the printing head into the light guide may thereby be provided.

The light emitter may be an organic or an in-organic quantum dot.

The plasmonic element may be a nanoparticle.

According to a third aspect a light guide comprising a light emitter or a plasmonic element introduced into the light guide according to the above is provided. The above mentioned features of the method and printing head, when applicable, apply to the third aspects as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Further features of, and advantages with, the present invention will become apparent when studying the appended claims and the following description. The skilled person will realize that different features of the present invention may be combined to create embodiments other than those described in the following, without departing from the scope of the present invention. Features of one aspect may be relevant to anyone of the other aspects, references to these features are hereby made.

Figure 1A:
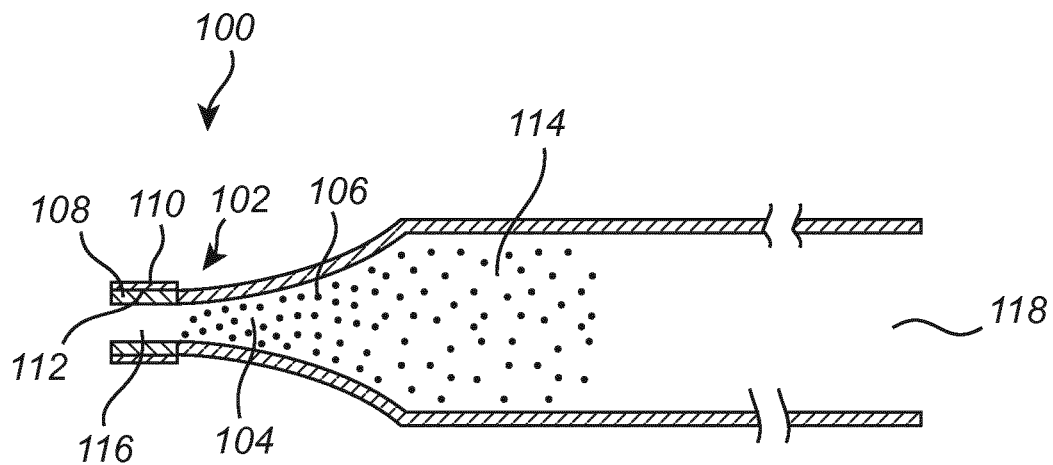
FIG. 1a illustrates schematically a cross-sectional side view of a printing head according to one embodiment.

FIG. 1a illustrates cross-sectional side view of a printing head 100 according to one embodiment. The printing head 100 is formed by a tapered micro-capillary tube. The printing head 100 comprises an insertion portion 102 having a channel 104 for providing passage of a plurality of light emitters 106 into a light guide (not shown). The printing head 100 further comprises a heating element 108 arranged at an outer surface 110 of the printing head 100. The heating element 108 is arranged to heat a portion of the light guide. The heating element 108 is further arranged to heat a portion 112 of the insertion portion 102. Heat generated by the heating element 108 of the printing head 100 may locally melt a portion of the light guide such that the light emitters 106 may be introduced into the light guide via the locally melted portion.

The heating of the light guide may be direct or indirect, i.e. the heating element 108 may directly heat a portion of the light guide or the heated portion 112 of the printing head 100 may heat a portion of the light guide.

The heating element 108 may be a resistive heating element. The heating element 108 may for example comprise a coiled resistive wire arranged inside a ceramic material. When an electrical current is applied to the wire, it generates heat that is transferred to the ceramic material and then to the silicon substrate and the metalized top surface. Alternatively, an etched foil heater comprising a resistive foil with a pattern etched through may be used. This resistive foil may be sandwiched between two sheets of adhesive and a dielectric material, such as polyimide or mica.

The heating element may in other embodiments only heat the light guide. In other words, other elements of the printing head may be thermally isolated from the heating element.

Again referring to FIG. 1a, the light emitters 106 are distributed in a fluid 114 such as water or ethanol which allows for simplified handling of the light emitters 106. An improved transport of the light emitters 106 into the light guide is further provided as adsorption of the light emitters 106 to surfaces of the printing head 100 is mitigated. The fluid 114 may moreover evaporate from the light guide as a result of coming in contact with the heated portion of the light guide after the introduction of the fluid with the light emitters into the light guide.

It should be noted that in other embodiment the light emitters may be distributed in a paste, or a powder. Alternatively, the light emitters may be distributed in a printing head comprising a gas such as air or nitrogen.

The printing head 100 comprises a first 116 and a second 118 opening. The first opening 116 is arranged as an outlet for the light emitters 106. The second opening 118 is arranged as an inlet of the light emitters 106 via which the light emitters 106 may be introduced into the printing head 100. The printing head 100 may further comprise an actuator (not shown). The actuator may be connected to the second opening 118. The actuator may be connected indirectly or directly to the second opening 118, thereby arranged for flowing fluid 114 comprising the light emitters 106 such as a part of the fluid 114 is transported into the printing element 100. Hence, the actuator may according to some embodiments be referred to as a flow generator. The light emitters 106 may thereby be transported to the first opening 116. The actuator may further pump or transport the light emitters 106 via the first opening 116 into a light guide to facilitate the introduction of the light emitters 106 into the light guide. In other words, the actuator is arranged to propagate the light emitter 106 through the channel and into the light guide.

The actuator may be a pump, such as a syringe pump, a peristaltic pump or a pressure pump.

The printing head may be a handheld device, allowing the device to be handled by one hand, while the other hand of the user is free to hold the light guide. A printing head which is simple to position in relation to a light guide is thereby obtained. The locations at which the light emitters are introduced into the light guide may thereby be selected and reached in an efficient manner.

Alternatively, the printing head may form part of system for introduction of the light emitters. The system may, for example, comprise a holder and positioner of the printing head 100. The system may be automated.

Figure 1B:
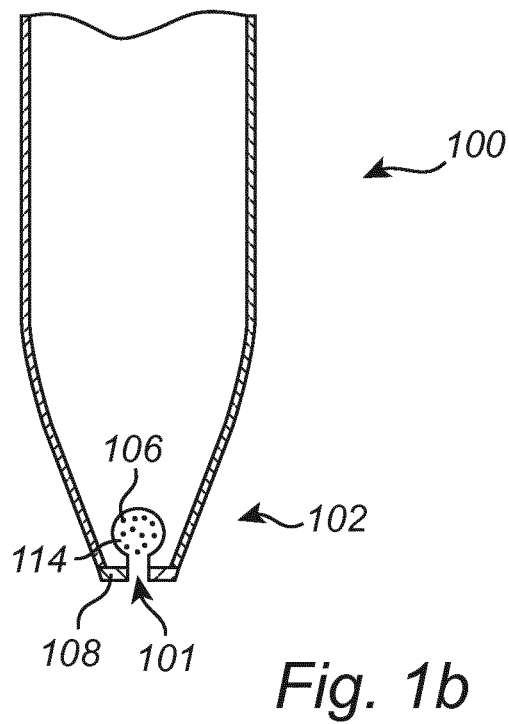
FIG. 1b illustrates schematically a cross-sectional side view of a printing head according to another embodiment.

FIG. 1b illustrates a cross-sectional side view of a printing head 100 according to another embodiment. The printing head 100 comprises a recess 101 comprising a plurality of light emitter 106. The printing head 100 may be referred to as a dip pen. The light emitters 106 may be arranged in the recess 101 by for example dipping at least the insertion portion 102 of the printing head 100 into a fluid containing the light emitters 106. The light emitters 106 may be transported into the recess 101 by capillary forces. Hence, the light emitters 106 within the recess 101 may be dispersed in the fluid 114.

The light emitters 106 may be stored in the recess 101.

The printing head 100 further comprises a heating element 108 arranged at the apex of the printing head 100. The heating element 108 is arranged to heat a portion of a light guide.

At least a portion of the light emitters 106 may further be introduced into a light guide after inserting the insertion portion 102 of the printing head 100 into a light guide.

The printing head may further comprise a fluid or gas channel (not shown) arranged in fluid or gas communication with the recess 101. A flow of fluid or gas may thereby be used to transport the light emitters 106 into the printing head or to transport the light emitters 106 from the recess 101 into a light guide.

In the following a method 300 for locally introducing a light emitter or a plasmonic element into a light guide will be described with reference to the FIGS. 2 and 3. FIGS. 2a-2c illustrate schematically cross-sectional side views of a local introduction of a light emitter 106 into a light guide 202 according to one embodiment. FIG. 3 illustrates the associated acts of the method 300.

Figure 2A:
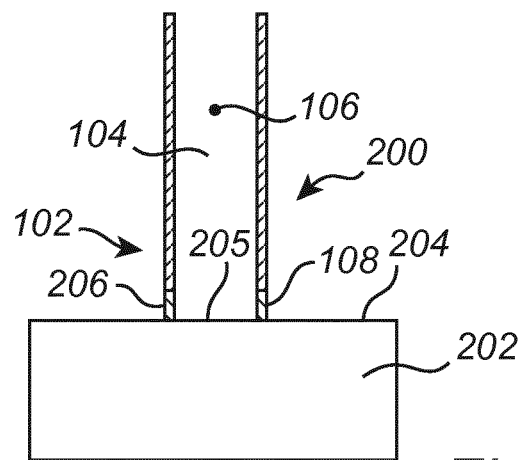
FIGS. 2a-2c illustrate schematically cross-sectional side views of a local introduction of a light emitter into a light guide according to one embodiment.
Figure 3:
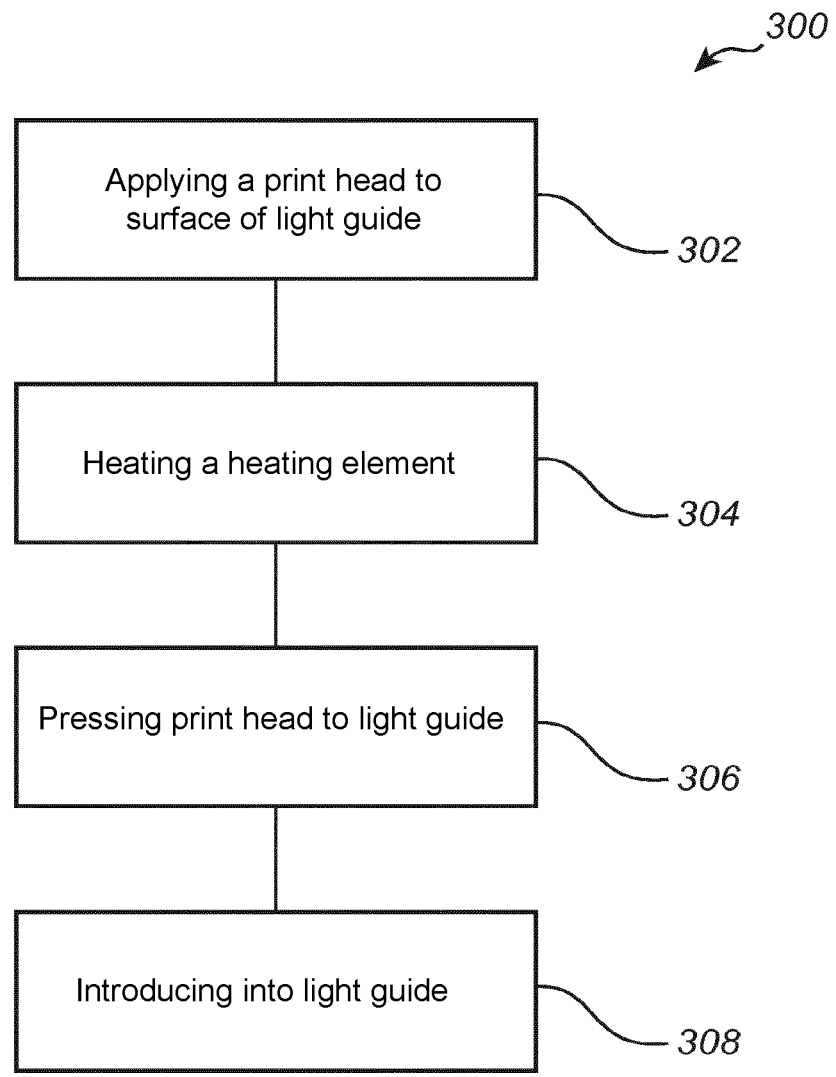
FIG. 3 illustrates a method for locally introducing a light emitter or a plasmonic element into a light guide.

In FIG. 2a a printing head 200 is applied 302 to a surface 204 of the light guide 202. The light guide 202 may comprise a glass material such as soda-lime glass.

The printing head 200 is arranged in contact with the surface 204. The printing head 200 comprises an insertion portion 102 and a heating element 108. The heating element is arranged at the apex 206 of the insertion portion 102. The heating element 108 is arranged to heat 304 a portion 205 of the surface 204 of light guide 202 as will be described below. The printing head 200 further comprises a channel 104 in which the light emitter 106 is arranged.

Figure 2B:
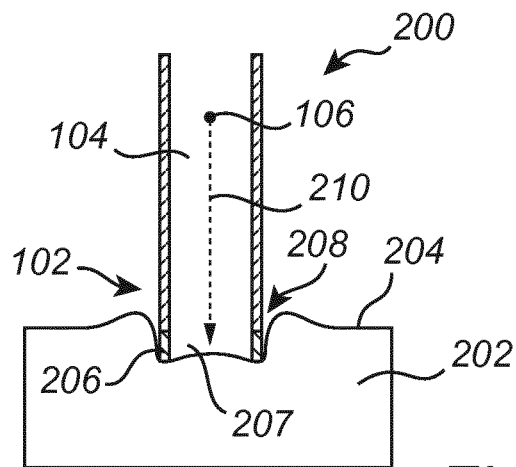

Referring to FIG. 2b, the act of heating 304 of the light guide 202 may cause a portion of the surface 204 of the light guide 202 to be locally melted. The melting may locally increase the viscosity of the material of the light guide 202. The melting thereby simplifies the insertion of the insertion portion 102 into the light guide 202, i.e. the printing head may more easily be pressed 306 into the light guide 202, as illustrated in FIG. 2b. By the pressing 306 material of the light guide 202 may be displaced such that a recess 207 is formed in the light guide 202. A portion 208 of the insertion portion 102 is thereby inserted into the light guide 202. By the insertion of the insertion portion 102 into the light guide 202 a passage for introducing 308 the light emitter 106 into the interior of the light guide 202 is provided. Hence the light emitter 106 may be transported via the channel 104 into the light guide 202 as illustrated by the dashed arrow 210.

Figure 2C:
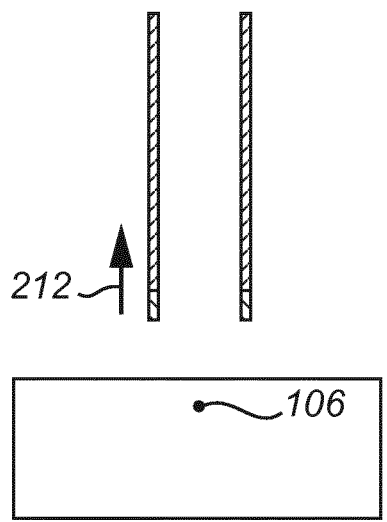

FIG. 2c illustrates how the printing head 200 may be retracted, as illustrated be the solid arrow 212, after the introduction 308 of the light emitter 106 into the light guide 202. The material in the heated portion 205 of the light guide 202 may at least partly refill the recess 207 as the printing head 200 is removed from the light guide 202. The light emitter 106 is thereby fixed at a given location inside the light guide 202 and protected from the environment of the light guide 202.

There may be a temporal overlap of the acts of heating, pressing and/or introducing. The heating element 108 may heat a portion of the light guide while the insertion portion 102 is inserted into the light guide 202. This simplifies the pressing 306 of the printing head 200 into the light guide 202 and also the retraction of the printing head 200 after the introduction of the light emitter 202 into the light guide 202. The heating 304 of the portion 205 of the light guide 202 further improves the reflow of material in the light guide 202 such that the recess 207 is refilled after the printing head is retracted. A fast, non-invasive and accurate method 300 for introducing 308 the light emitter 106 into the light guide 202 is thereby provided.

To this end, the insertion portion 102 may have a width in the range of 0.1 mm-2 mm. This facilitates local heating 304 and introduction 308 of the light emitter 106 into the light guide 202 without substantially affecting the light guide 202 at other locations.

For a light guide comprising glass as described above, the act of heating 304 may comprise heating the heating element 108 to a temperature in the range of 500° C.-900° C. for a time period in the range of 1-10 microseconds. Temperatures in this range facilities an effective local melting of the glass material of the light guide 202. This time period further allows for local melting of the glass material allowing for efficient introduction of the light emitter 106 into the light guide 202 via the locally melted glass material.

The act of pressing 306, heating 304 and/or introducing 308 may be performed in a time period in the range of 1-10 milliseconds. A high throughput method 300 for introducing a light emitter 106 into the light guide 202 may thereby be provided.

It should, however, be noted that the temperatures and time periods may differ for other embodiments. The method 300 for introducing a light emitter 106 into a light guide, where the light guide comprises a plastic material may for example be different. The given temperature may for example be reduced if the melting point of the material of the surface of the light guide is lower than for glass.

It should be noted that in other embodiments the material of the light guide may not be heated before introducing the light emitter into the light guide, i.e. before pressing the printing head into the light guide. The light guide may for example be at least partly molten as a result of the fabrication of the light guide. The light guide may alternatively comprise a soft material into which the printing head may be pressed.

In the above the description, the introduction of light emitters have been described. According to other embodiments a plasmonic element may be introduced into the light guide by the method 300.

The printing head 200 may in other embodiments be the printing head 100 described above in relation to FIGS. 1a and 1b.

Figure 4:
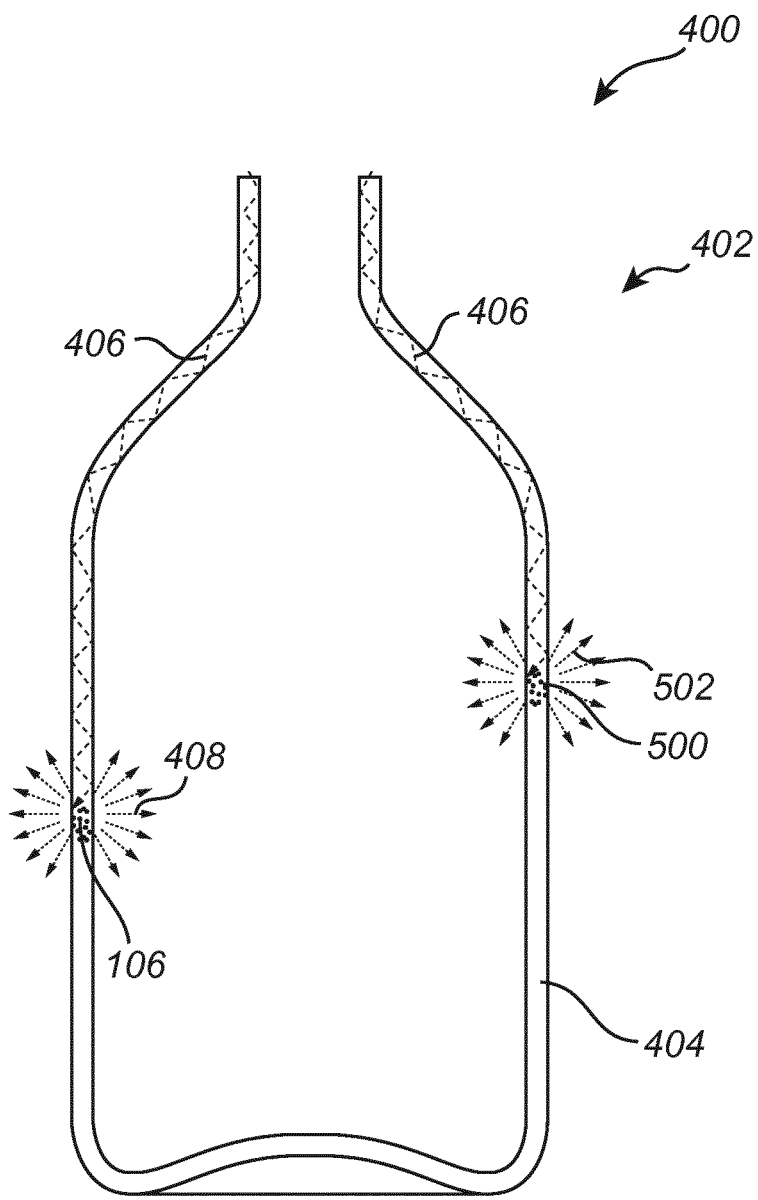
FIG. 4 illustrates schematically a cross-sectional side view of a container comprising a light emitter and a plasmonic element introduced by use of the method of FIG. 3.

FIG. 4 illustrates a container 400 in the form of a bottle 402 comprising a container wall 404. The container wall 404 further forms a light guide. The container wall 404 may thereby guide light 406 inside the material forming the container wall 404, as will be discussed below.

It should be noted that the container 400 may, however, in other embodiments be formed differently. The container 400 may for example be a perfume bottle or a jar for food stuff. According to one embodiment the container 400 is a bottle for containing a liquid such as a beverage. The beverage may e.g. be vodka, wine, port wine, beer or other beverages containing alcohol.

A plurality of light emitters 106 are arranged in the container wall 404. The light emitters 106 have been introduced into the container wall 404 by use of the method 300 describe above.

The material of the container wall 404, i.e. the light guide, may be translucent or transparent. The wording "translucent" is to be understood as permitting the passage of light. The container 400 may therefore comprise a portion that is clear, in other words transparent to light, and/or a portion that is transmitting and diffusing light such that objects within the container 400 cannot be seen clearly from outside the container 400. Hence, the translucent material may either be clear, i.e. transparent, or transmitting and diffusing light so that objects beyond cannot be seen clearly. "Transparent" is to be understood as "able to be seen through".

As discussed above, the container wall 404 may act as the light guide as illustrated in FIG. 4 by the light path 406. A light source, not shown, may further be arranged to emit light into the container wall 404 of the container 400 such that the light 406 may propagate within the container wall 404. The propagation of light within the container wall 404 may be by total internal reflection, TIR. Light distributed by TIR may efficiently propagate within the container wall 404. Hence, a larger portion of light 406 may efficiently be transported within the container wall 404.

TIR should be construed as an optical effect that occur when a ray of light reaches a boundary between a first and a second medium at an angle larger than a critical angle, with respect to the normal of the boundary surface. For TIR to occur it is needed that the refractive index of the first medium is larger than the refractive index of the second material, i.e. in order for the light ray to be totally reflected at the boundary such that no light propagate beyond the boundary and all light is substantially reflected at the boundary.

A smooth surface structure of the material of the container wall 404 may further improve the efficiently at which light 406 propagates within the container wall 404. In other words, a substantial portion of the light sent into the container wall 404 may propagate within the container wall 404 and be guided to the light emitters 106 without being scattered or refracted out from the container wall 404.

The light 406 reaching the light emitters 106 may excite the light emitters 106. The light emitters 106 may as a result emit light 408 by for example fluorescence or photoluminescence processes. The light emitters 106 may thereby act as wavelength converting elements, converting incoming, i.e. exciting, light 406 of a first wavelength to light of a second wavelength, the light of the second wavelength being emitted from the light emitter 106.

An additional light emitter or a plurality of light emitters (not shown) may be introduced into the container wall 404 at the same or another location. The light emitters 106 and the additional light emitter/s may be of the same or different kinds. Light emission from a plurality of light emitters and/or locations of the container 400 may thereby be obtained. The light emission may comprise a single or a plurality of colours depending on the type of light emitters introduced into the container wall 404. Hence, a spatial and structural composition of light emitted from the container 400 may be chosen.

Furthermore, a plasmonic element or a plurality of plasmonic elements 500 may be introduced into the container wall 404 by the use of the method 300, see FIG. 4. The plasmonic elements 500 are illustrated to scatter 502 light 406 which is guided to the plasmonic elements 500. The plasmonic elements 500 may thereby influence the distribution of light within the container wall 404. The light scattering 502 at the location of the plasmonic elements 500 may couple out light from the container wall 404. Hence, at least a portion of the light 406 propagating in the container wall 404 may be redirected in space by the plasmonic elements 500. An increased portion of light coupled out of the container wall 404 may thereby be obtained at the location of the plasmonic elements 500.

A plurality of scattering plasmonic elements at the same or at different locations within the container wall 400 may thereby form patterns within the container wall 404.

The plasmonic elements 500 may in other embodiments predominately absorb light 406 propagating within the container wall 404. The skilled person in the art realizes that the relative strength of the absorption and the scattering of the plasmonic element may for example be varied by using plasmonic elements having different sizes or by changing the material of the plasmonic element.

The light absorption of a plasmonic element may for example reduce the light intensity at the location of the plasmonic element. A darker region may thereby be obtained within a light guide. A plurality of absorbing plasmonic elements may thereby form patterns within the light guide.

Light emitters or plasmonic elements of similar or of different types may be arranged in patterns by the method 300 described. The pattern may for example form a text or symbol. A trademark or logo may thereby be visible by the light emission from the light emitters.

A plasmonic element may be a nanoparticle. A plasmonic element which provides a localized surface plasmon resonance, LSPR, may thereby be achieved. The nanoparticle may for instance comprise a metal or a doped semiconductor material. The wording "localized surface plasmon resonance" is to be understood as an excited state of the charge carriers within the plasmonic element, which can be excited by photons or, equivalently, by the electromagnetic field of light incident on the plasmonic element. The LSPR is associated to the collective oscillation of charge density and to the boundary conditions resulting from the finite size of the plasmonic element.

Light scattering or light absorption may occur as a result of the LSPR. The LSPR may thus influence how light is interacting with the plasmonic element. Light having a wavelength corresponding to the LSPR may for example be scattered or absorbed to a larger extent than wavelength not corresponding to the LSPR. The spectral position of the LSPR, i.e. the wavelength at which the LSPR occurs, may depend on the composition, size or shape of the plasmonic element, as well as the refractive index of the light guide and/or another material surrounding the plasmonic element.

The light emitter may comprise a Quantum Dot (QD). QDs are small crystals of semiconducting material generally having a width or diameter of only a few tens of nanometers. They have the advantage that when excited by incident light, they emit light where the wavelength of the light is determined by the size and material of the QD. Further, they show very narrow emission bands and may thus provide saturated colors, where the light output of a particular colour can be produced by tailoring the material and size of the QDs used.

The QDs may comprise a material selected from the group consisting of but not limited to II-VI and III-V QDs. The QDs can be overcoated with higher band-gap materials for enhanced emissive properties. The light emitter may for example comprise a CdSe in the core and ZnS coating.

The light emitter may comprise an organic QD.

The light emitter may comprise a luminescent material having dimensions in the micrometer to millimetre range.

The light emitter may alternatively comprise an inorganic phosphor. The phosphor may for example comprise ZnS:Ag:Cl, ZnS:Cu:Al and $Y_2O_2S$:Eu providing light emission in the blue, green and red parts of the visible spectrum The light emitter may further comprise a fluorescent molecule.

The metal of the plasmonic element may for example be selected from a group consisting of Au, Ag, Cu, Al, Mg, Ni, Pd and Pt, or alloys comprising at least one metal selected from the group. These materials may provide efficient formation of surface plasmons.

The plasmonic element may for example be a gold or silver nanoparticle having a diameter in the range of 5-200 nm.

The person skilled in the art further realizes that the present invention by no means is limited to the preferred embodiments described above. On the contrary, many modifications and variations are possible within the scope of the appended claims.

For example, the printing head may alternatively be formed of a metal such as aluminum or stainless steel.

The heating element may be arranged to inductively heat the light guide.

In other embodiment the micro-capillary tube may not comprise a tapering.

The micro-capillary tube forming a part of the printing head may comprise aluminosilicate glass having a higher melting point than for example soda lime glass allowing for efficient melting of the light guide, but not the printing head.

The printing head may in another embodiment comprise an insertion portion comprising an outer surface onto which a light emitter or a plasmonic element may be arranged. The outer surface may for example be a flat surface.

It should, however, be realized that the light guide may in other embodiments have different forms and may comprise different materials than described in relation to FIG. 4. The light guide may, for instance, be a light concentrator or an optical fibre. Hence, it is realized that the method 300 may be applied to light guides of different kinds than the one formed by the container wall 404.

Additionally, variations to the disclosed embodiments can be understood and effected by the skilled person in practicing the claimed invention, from a study of the drawings, the disclosure, and the appended claims.

The invention claimed is:

1. A method for locally introducing a light emitter or a plasmonic element into a light guide, the method comprising the acts of:
applying a printing head to a surface of the light guide, the printing head comprising an insertion portion comprising the light emitter or the plasmonic element and a heating element,
heating the heating element such that a portion of the surface of the light guide is locally heated,
pressing the printing head into the light guide such that at least a portion of the insertion portion is inserted into the light guide,
introducing the light emitter or the plasmonic element into the light guide via the insertion portion.

2. The method according to claim 1, wherein the insertion portion comprises a recess comprising the light emitter or the plasmonic element.

3. The method according to claim 1, wherein the insertion portion comprises a channel providing passage of the light emitter or the plasmonic element.

4. The method according to claim 1, wherein there is a temporal overlap of the acts of heating, pressing and/or introducing.

5. The method according to claim 1, wherein the act of pressing, heating and/or introducing is performed in a time period in the range of 1-10 milliseconds.

6. The method according to claim 1, wherein the light guide comprises a glass material.

7. A printing head arranged to introduce a light emitter or a plasmonic element into a light guide, the printing head comprising:
an insertion portion comprising the light emitter or the plasmonic element, the insertion portion being arranged to be inserted into the light guide, and
a heating element arranged to locally heat a portion of the surface of the light guide.

8. The printing head according to claim 7, wherein the insertion portion comprises a recess comprising the light emitter or the plasmonic element.

9. The printing head according to claim 7, wherein the insertion portion comprises a channel providing passage of the light emitter or the plasmonic element.

10. The printing head according to claim 9 further comprising an actuator arranged to propagate the light emitter or the plasmonic element through the channel and into the light guide.

11. The method according to claim 1, wherein the light emitter is an organic or an in-organic quantum dot.

12. The method according to claim 1, wherein the plasmonic element is a nanoparticle.

13. The printing head according to claim 7, wherein the heating element is arranged at the apex of the printing head.

14. Use of a printing head according to claim 7 to locally introduce a light emitter or a plasmonic element into a light guide.

* * * * *